US008135200B2

United States Patent
Kalayeh

(10) Patent No.: US 8,135,200 B2
(45) Date of Patent: Mar. 13, 2012

(54) IMAGING AUTO SHUTTER ROI

(75) Inventor: Hooshmand M. Kalayeh, Pittsford, NY (US)

(73) Assignee: InfiMed, Inc., Liverpool, NY (US)

( * ) Notice: Subject to any disclaimer, the term of this patent is extended or adjusted under 35 U.S.C. 154(b) by 922 days.

(21) Appl. No.: 12/167,373

(22) Filed: Jul. 3, 2008

(65) Prior Publication Data
US 2010/0002927 A1 Jan. 7, 2010

(51) Int. Cl.
*G06K 9/00* (2006.01)
(52) U.S. Cl. ..................................... 382/132
(58) Field of Classification Search ............ 382/128, 382/132
See application file for complete search history.

(56) References Cited

U.S. PATENT DOCUMENTS

| 6,775,399 B1* | 8/2004 | Jiang ............ 382/128 |
| 7,508,970 B2* | 3/2009 | Jabri et al. ...... 382/132 |
| 2008/0212864 A1* | 9/2008 | Bornefalk ...... 382/132 |
| 2009/0238433 A1* | 9/2009 | Rao et al. ...... 382/132 |

OTHER PUBLICATIONS

R. Wiemker, S. Dippel, M. Stahl, T. M. Buzug: A graph approach to automated shutter detection in digital X-Ray images, Proceedings of Computer Assisted Radiology and Surgery CARS 99 Paris, Jun. 1999, H.U.Lemke, M.W.Vannier, K.Inamura, A.G.Farman (Ed.), Elsevier Amsterdam, p. 14-18.

* cited by examiner

*Primary Examiner* — Jurie Yun
(74) *Attorney, Agent, or Firm* — Hiscock & Barclay, LLP

(57) ABSTRACT

A method to identify a Region Of Interest (ROI) within an image includes the steps of: reading a digital image; finding predetermined brightness values; analyzing lines near a plurality of outer edges of the digital image; identifying an entire area of the digital image as the ROI if the found brightness values are also found in lines near the plurality of outer edges of the digital image; computing Radon transforms to generate one dimensional (1D) projections of the digital image if the found brightness values are not found in the lines; detecting a set of edges within the 1D projections; selecting edges from the set of edges; validating the selected edges to identify a set of validated edges; computing the ROI from the set of validated edges of the 1D projections; and saving the computed ROI to memory. A system to perform the method is also described.

24 Claims, 10 Drawing Sheets

| Number Of images | Number of failed images | Number of failed or passed questionable images | Number of passed images |
|---|---|---|---|
| 176 Percent | 3 | 9 | 173 |
| 100% | 1.7% | 5% | 98.3% |

FIG. 8

IMAGING AUTO SHUTTER ROI

FIELD OF THE INVENTION

This invention relates generally to an imaging system using autoshutter and more particularly to a method for finding a region of interest in a digital image.

BACKGROUND OF THE INVENTION

In medical imaging, such as digital radiography, one significant goal is minimize patient exposure to x-rays. As such, medical imaging X-ray light source typically includes movable (adjustable) "blades" that limit an area of exposure to the general vicinity of the section of human anatomy of interest, the "Region Of Interest" (ROI). For example, a relatively small exposure area might be used to image a human hand. There can be four blades (e.g. right, left, top, and bottom) that can range from fully open (maximum exposure area), to partially closed, causing a relatively small rectangular exposure area. Imaging equipment generally provides a sensor or detector that records the maximum possible exposure area and generates a digital image. The digital image contains exposed and unexposed regions. Further image processing of the entire detector area can be wasteful, since there is no useful diagnostic information in unexposed regions.

What is needed, therefore, is a system and method to identify an ROI in an x-ray image and to limit image processing to only exposed regions.

SUMMARY OF THE INVENTION

According to one aspect, a method to identify a region of interest (ROI) within an image includes the steps of: providing a digital image; reading the digital image; finding one or more predetermined brightness values in the digital image; analyzing one or more lines near a plurality of outer edges of the digital image to test for values statistically close in brightness to the to the one or more found brightness values; identifying an entire area of the digital image as the ROI if the found brightness values are also found in one or more lines near the plurality of outer edges of the digital image; computing two or more Radon transforms to generate two or more one dimensional (1D) projections of the digital image if the found brightness values are not found in the one or more lines near the outer edges of the digital image; detecting a set of edges within the two or more 1D projections; selecting edges from the set of edges; validating the selected edges to identify a set of validated edges; computing the ROI from the set of validated edges of the two or more 1D projections; and saving the computed ROI to memory.

In one embodiment, computing two or more Radon transforms includes at least one Radon transform having a projection.

In another embodiment, computing two or more Radon transforms includes at least one Radon transform having a maximum projection.

In yet another embodiment, computing two or more Radon transforms includes computing a Radon transform projection of each column and each row of the digital image.

In yet another embodiment, computing two or more Radon transforms includes at least one Radon transform having a mean projection.

In yet another embodiment, computing two or more Radon transforms further includes computing a Radon transformation off-axis from the rows and columns.

In yet another embodiment, computing two or more Radon transforms includes computing a Radon transformation having a projection at an angle.

In yet another embodiment, computing two or more Radon transforms includes computing a Radon transformation having horizontal and vertical mean projections.

In yet another embodiment, computing two or more Radon transforms includes computing one or more mean projections.

In yet another embodiment, validating the selected edges to create a set of validated edges further includes excluding one or more of the selected edges.

In yet another embodiment, computing the ROI from the detected edges further comprises excluding one or more of the detected edges within a pre-determined region of the digital image.

In yet another embodiment, the method further includes a step of setting starting ROI values to zeros, between the step of reading the digital image and the step of finding one or more maximum brightness values.

In yet another embodiment, if the ROI values are not successfully computed from the detected edges of the two or more mean projections of the digital image, the ROI values are set to final values which include an entire area of the digital image and the digital image is saved to memory in its entirety.

In yet another embodiment, the method further includes setting values of the digital image outside of the ROI, as computed in the step of computing the ROI from the detected edges, to zero or a prespecified value and saving the ROI.

According to another aspect, an imaging system includes a source of imaging radiation having a shutter (aperture) configured by one or more adjustable blades. The imaging system also includes a detector for detecting an absorbed, transmitted, or projection of the imaging radiation in a plane. The imaging system also includes an imaging computer component communicatively coupled to the detector and configured to run an auto shutter ROI algorithm to find a region of interest (ROI), wherein the autoshutter ROI algorithm is configured to read a digital image electronically from the detector following a medical image acquisition, find one or more maximum brightness values within the digital image, analyze one or more lines near the outer edges of the digital image to look for values at or near the maximum brightness values, set the ROI to an entire area of the digital image if the maximum brightness values are found in one or more lines near the outer edges of the digital image indicating that the shutter (aperture) was substantially fully open during an exposure that created the digital image. Also, wherein if the maximum brightness values are not found by using the one or more lines near the outer edges of the digital image indicating that the shutter aperture was not in a substantially fully opened position during an exposure that created the digital image, the autoshutter ROI algorithm configured to calculate two or more Radon transforms to generate two or more 1D projections of the digital image to detect edges in the 1D projections, wherein one or more of the detected edges are selected, and the selected edges are validated to compute the ROI from the detected edges of the two or more mean projections of the digital image, and to save the ROI as computed to memory.

In one embodiment, the source of imaging radiation includes an X-ray source.

In another embodiment, the two or more Radon transforms include projections of each column and each row of the digital image.

In yet another embodiment, at least one Radon transform includes a mean projection.

In yet another embodiment, the autoshutter ROI algorithm is further configured to calculate at least one Radon transformation off-axis from the rows and columns.

In yet another embodiment, the at least one Radon transformation off-axis from the rows and columns includes a mean projection.

In yet another embodiment, the autoshutter ROI algorithm is further configured to reject one or more computed edges within pre-determined region of the digital image.

In yet another embodiment, the autoshutter ROI algorithm is further configured to set a set of starting ROI values to zeros after the digital image is read.

In yet another embodiment, if the ROI values are not successfully computed from the detected edges of the two or more mean projections of the digital image, the ROI values are set to final values which include an entire area of the digital image and the digital image is saved to memory in its entirety.

In yet another embodiment, the system further includes setting values of the digital image outside of the ROI to zero or a prespecified value and saving the ROI as an extracted image.

BRIEF DESCRIPTION OF THE DRAWINGS

For a further understanding of these and objects of the invention, reference will be made to the following detailed description of the invention which is to be read in connection with the accompanying drawings, where:

FIG. 8 shows a table of test results using the auto shutter ROI method to process digital x-ray images.

The drawings are not necessarily to scale, emphasis instead generally being placed upon illustrating the principles of the invention. In the drawings, like numerals are used to indicate like parts throughout the various views.

DETAILED DESCRIPTION

Figure 9:
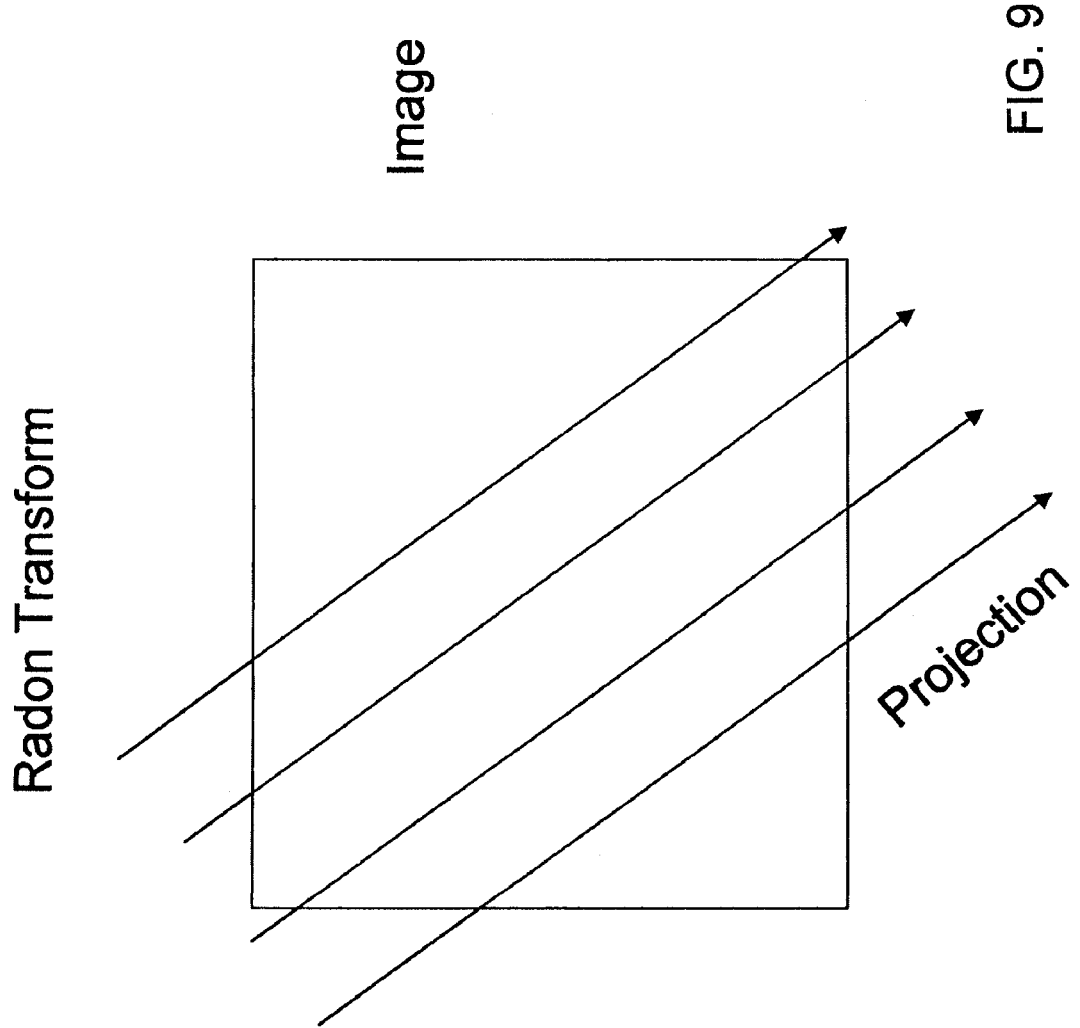
FIG. 9 shows a Radon transform using an off-axis projection with respect to a two dimensional Cartesian coordinate system.

DEFINITIONS: A Mean projection of an image is considered herein to be a subset of the larger set of mathematical Radon transforms. By standard definition, Radon transforms, as shown in FIG. 9 can be performed on or off-axis with respect to a two dimensional Cartesian coordinate system. In general, a Radon transform is the integral of an N-dimensional function over a hyperplane. For a 2D function, the Radon transform is the integral of the function over a line. In image processing, a Radon transform is the projection of image intensity along a radial line oriented at a specific angle. For example, horizontal and vertical projections are commonly used for Radon transforms in image processing.

"Saving" or recording data such as intermediate data, calculations, or the results of an auto shutter ROI operation to memory, such as for example, recording ROI and image information is understood to mean and defined herein as "writing" output data to a storage element or device. For example, recording the ROI and/or image data for further processing or as output data can include, but is not limited to, writing data to random access memory ("RAM") (volatile or non-volatile), SRAM, DRAM, and EEPROM. Such digital memory elements or chips can be standalone memory devices, or can be incorporated within a programmable array, such as a field programmable array ("FPGA"), or within a microcomputer. Saving ROI and/or image data as defined herein, also includes writing transformed data to registers within a microcomputer. Memory elements or devices can also include other writing means, such as writing digital data to a magnetic storage device, such as a hard drive, magnetic technology disc, or other disc media, such as an optical CD media, or DVD media.

"Microcomputer" is defined herein as synonymous with microprocessor, microcontroller, and digital signal processor ("DSP"). It is understood that memory used by the microcomputer, including for example an auto shutter ROI algorithm coded as "firmware" can reside in memory physically inside of a microcomputer chip or in memory external to the microcomputer or in a combination of internal and external memory. Similarly, analog signals can be digitized by one or more ADCs or multiplexed ADC channels that can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer. A "computer" as used herein is understood to include one or more microcomputers.

Figure 1:
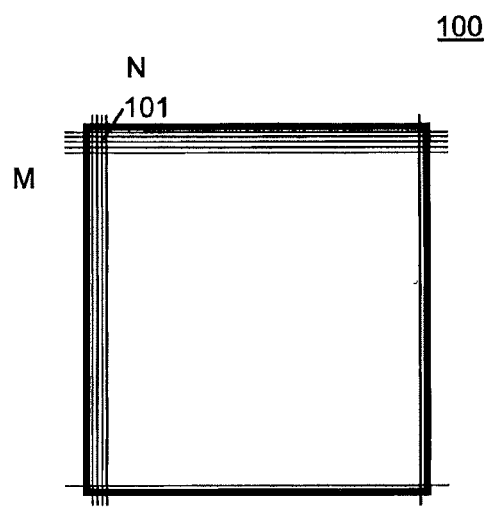
FIG. 1 shows a representation of a digital image 100 having M rows and N columns.

FIG. 1 shows a representation of a digital image 100 having M rows and N columns of pixels 101 for a total of M×N pixels 101. Each pixel 101 has associated with it an intensity "gray scale" unitless value. Typically there are $2^N$ intensity values, where N is the number of bits of intensity information (e.g. brightness on a gray scale).

Figure 2:
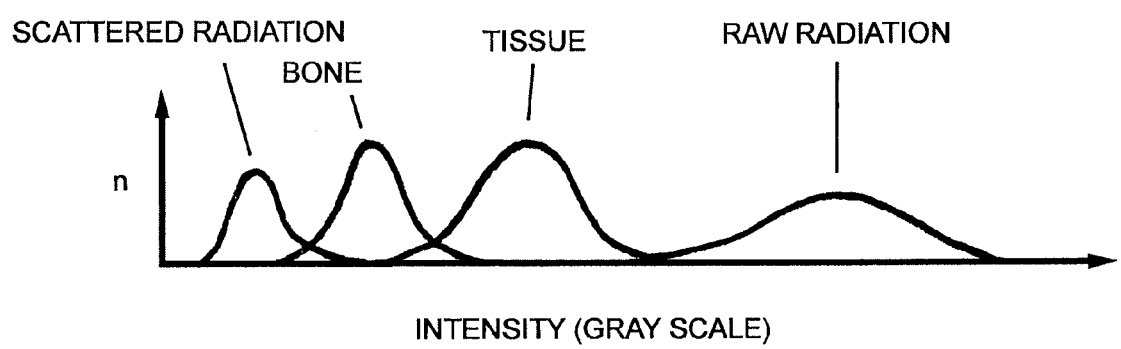
FIG. 2 shows a histogram of intensity (gray scale brightness) values of an exemplary x-ray digital image.

FIG. 2 shows an exemplary histogram of intensity values for M×N rows and columns of pixels in an x-ray digital image 100. The histogram representation shows a number "n" of recorded values (vertical scale) at each intensity or gray scale level (horizontal scale) with the "brightest" values towards the right side of the graph. As shown in FIG. 2, there are typically four intensity histograms corresponding to scatter radiation, bone absorption, tissue absorption in an image, and raw radiation (radiation passing directly to the detector), respectively. Note that "raw radiation" values, where the x-rays passed from the source to the detector mostly through a path of air are the brightest exposed pixels in the digital image.

Figure 3A:
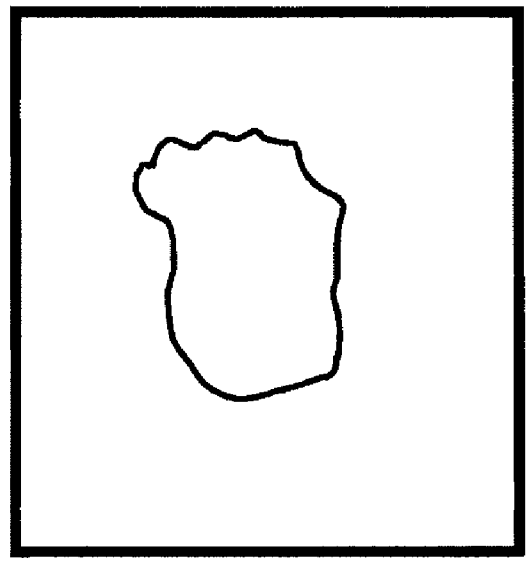
FIG. 3A shows a representation of a digital image where all four blades of a shutter were fully open at the time of exposure.
Figure 3B:
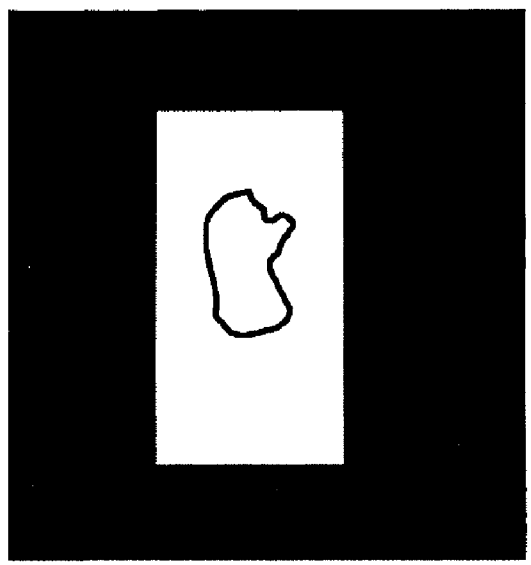
FIG. 3B shows a representation of a digital image where all four blades of a shutter were partially open at the time of exposure.

As discussed above, there can typically be present "blades" (typically two or four) generally associated with the source of radiation. The blades can be used to set a shutter (aperture) for an exposure, most commonly an x-ray exposure. Generally there are two moveable (adjustable) blades in an x direction and two moveable blades in a y direction. Such blades can be manually moved and set, or driven and set by electromechanical means. FIG. 3A shows a representation of a digital image 100 where all four "blades" were fully open at the time of exposure (when the image was made). An exemplary physiological structure is shown surrounded by a "brighter" area indicative of raw radiation. There is raw radiation exposure where the x-rays reached portions of the plane of M×N pixels 101 without first passing through bone or other physiological matter of interest. Or, some brighter perimeter areas (typically less bright than due to raw radiation exposure) can be caused by exposure through tissue where there are no free paths from the source of radiation to the plane of the detector. FIG. 3B shows a representation of a digital image 100 in which all four "blades" were partially closed at the time of exposure. Since the physiological structure of interest for the exposure of FIG. 3B fits within a relatively small area of the digital image 100, the clinician administering the x-ray chose to limit unnecessary exposure to surrounding tissue by partially closing the blades.

One of the advantages of digital x-ray imaging, compared to film exposures of old, is that computers can run algorithms to perform various types of post-exposure image enhancement. Speed of image processing is almost always an issue, and faster processing speeds are better. One way to achieve higher speeds in image processing is to limit the pixel size of the image being processed. For example, to process an image 100 as shown in FIG. 3A, an algorithm should process M×N pixels 101. However, it can be computationally wasteful to process M×N pixels 101 for the image 100 of FIG. 3B, since by definition, any part of the image shaded by the blades, while possibly including indications of scattered radiation, contains no useful physiological information.

The area of interest for any given digital x-ray image 100 is generally referred to as the Region Of Interest (ROI). In the description which follows, a new method, "auto shutter ROI" that can automatically identifying the ROI of an image, such as a digital x-ray image 100, is described. The method can be interchangeably referred to as "Autoshutter ROI", "AutoshutterROI", "AutoROI", or "Auto ROI". The description begins with an overview of the method using two block diagrams, one simplified to show the general principle of the method, and the second block diagram a somewhat more detailed block diagram of one embodiment of the auto shutter ROI method. Following this overview, two examples are described, one example in which the auto shutter ROI method analyzes an x-ray image 100 in which the blades were fully open at the time of exposure and another example where the blades were partially closed at the time of exposure.

Figure 4A:
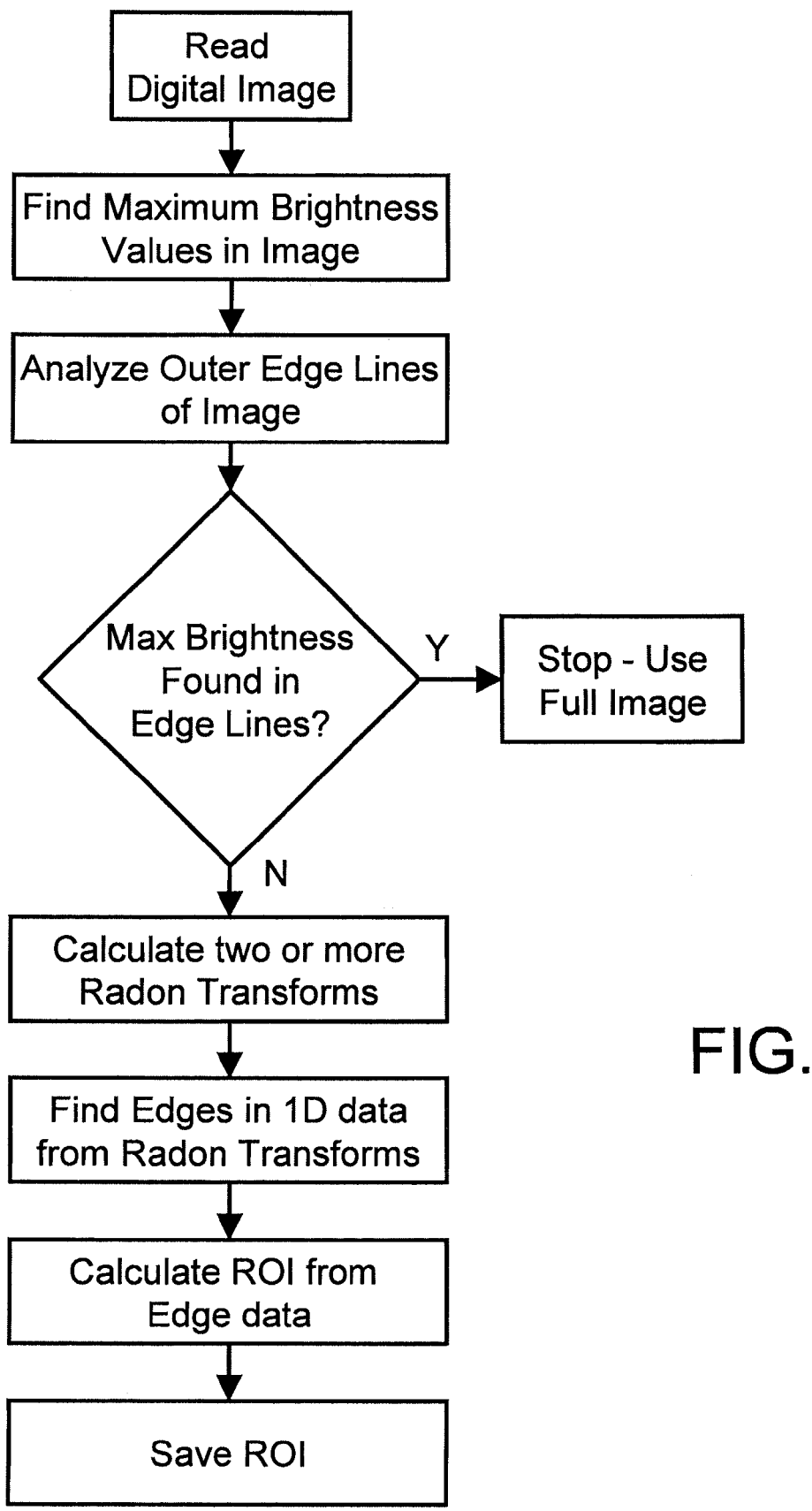
FIG. 4A shows a simplified block diagram of an auto shutter ROI algorithm.

FIG. 4A shows a simplified block diagram of one embodiment of an auto shutter ROI algorithm. A computer, such as an embedded microcomputer, programmed to perform an auto shutter ROI algorithm, can read a digital image into memory from a two dimensional (2D) detector. Or, where the image has already been read from a detector, the computer can read or use the image from a memory location in which the digital image has been previously stored. One or more maximum brightness values are found in the digital image. Next, one or more lines near the outer edges of the digital image are analyzed to look for values at or near (statistically close to) the one or more brightness values. If the brightness values are found in the one or more lines near the outer edges of the digital image, the entire area of the digital image is used. If the brightness values are not found in the one or more lines near the outer edges of the digital image, then two or more Radon transforms are calculated to generate two or more one dimensional (1D) projections of the digital image. Note that the two or more Radon transforms can be calculated for rows and columns or performed off-axis. In some embodiments, the Radon transformations can be mean projections. Edges can be detected in the two or more of the 1D projections. The ROI can be calculated from the detected edges of the two or more 1D projections. Note that edges within a pre-determined area of the digital image, such as within a pre-determined distance from the center of the image, can be rejected. Therefore it can be seen that edges can be detected in two or more 1D projections, edges can be selected from the detected edges, and some or all of the selected edges can be validated. Finally, the calculated ROI can be saved to memory.

Figure 4B:
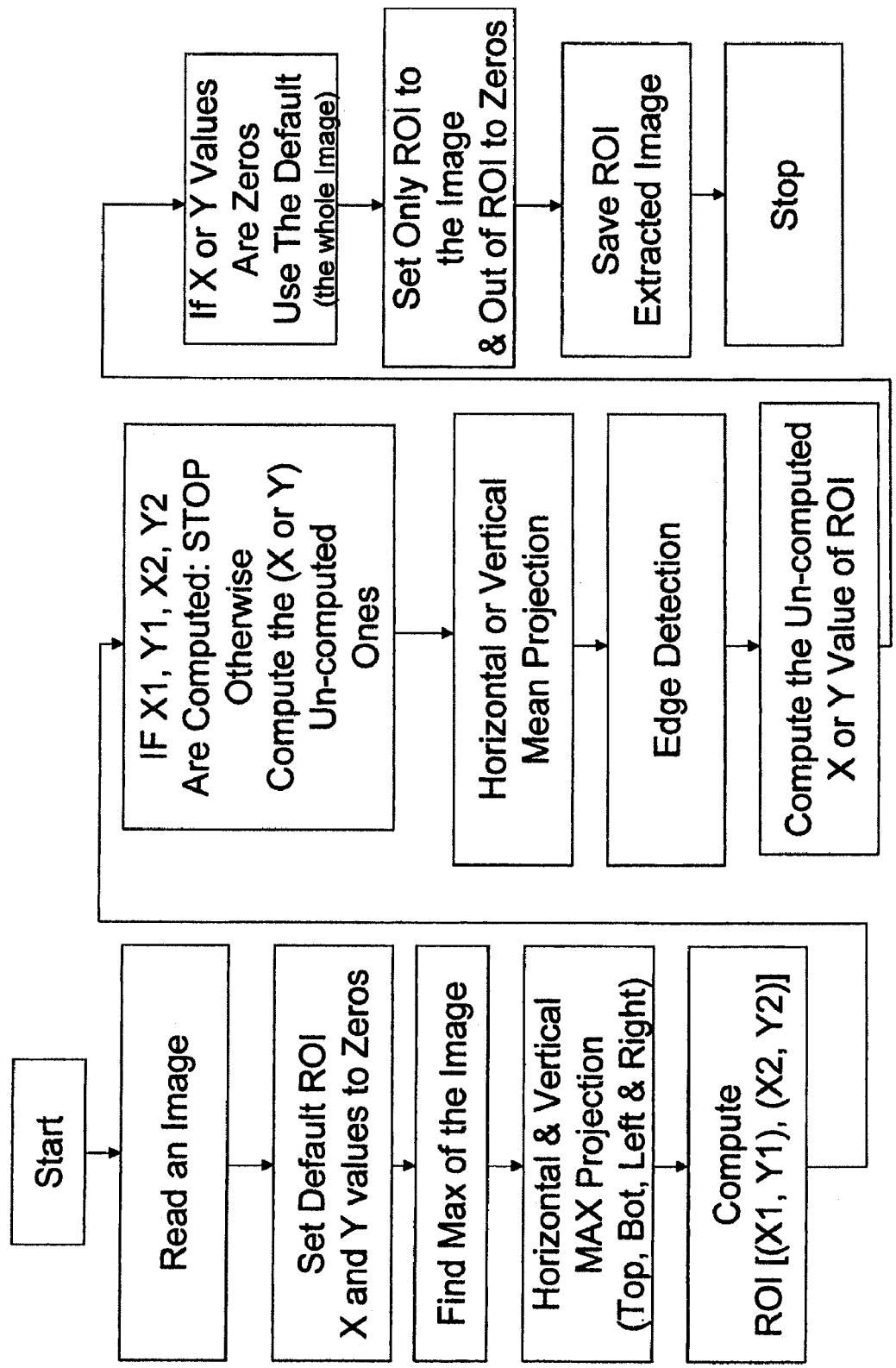
FIG. 4B shows a block diagram of one embodiment of an auto shutter ROI algorithm.

FIG. 4B shows a block diagram of one embodiment of an auto shutter ROI algorithm. After starting the algorithm (step "Start"), an image is read in its entirety (step "Read the Image"). Default X (column) and Y (row) values are then set to zeros (step "Set Default ROI X and Y values to Zeros") (the set of default ROI starting values are set to zero). The maximum intensity of the image is then found (step "Find Max of the Image") and stored at least temporarily for use within the autoshutter ROI algorithm. The horizontal maximum projection (maximum values found along the top, bottom, left, and right sides of the image) are identified (step "Horizontal & Vertical MAX Projection (Top, Bot, Left & Right)"). A computation of the ROI is performed to attempt to identify an ROI of extent [(X1,Y1), (X2,Y2)] (step "Compute ROI [(X1,Y1), (X2, Y2)]"). If X1, Y1, X2, Y2 are computed, all four apertures are fully open (analogous to the aperture setting shown in FIG. 3A) and the algorithm can stop with all X and Y values set to entire image (as an indication of a fully open aperture) (step "IF X1, Y1, X2, Y2 Are Computed: STOP Otherwise Compute the (X or Y) Un-computed Ones"). Otherwise in the case of a non-fully opened aperture, the algorithm proceeds to compute X and Y values of an ROI as set by the blades. Horizontal (e.g. rows), vertical (e.g. columns) and/or diagonal mean projections are calculated for the digital image (step "Horizontal or Vertical Mean Projection"). Note that this step can be more generally performed by a Radon transform and that a mean projection is defined herein as a subset of Radon transforms. Any suitable Radon transform can be used. From the resulting mean projections, edge detection is performed (step "Edge Detection"). Using the results of the edge detection calculations, the previously un-computed X and Y values of the ROI can be determined (step "Compute the Un-computed X or Y Value of ROI"). A test checks for all X and Y values set to the zero, in which case the full extent of the entire image is considered as the ROI (aperture fully opened) (step "If X or Y Values Are Zeros Use The Default (the whole image)"). That is, if the ROI values are not successfully computed from the detected edges of the two or more mean projections of the digital image, the ROI values are set to final values which include an entire area of the digital image and the digital image is saved to memory in its entirety. Otherwise, non-zero computed X and Y values indicate the automatically determined ROI, in which case all image pixel values outside of the computed ROI can be set to zero or a pre-specified value (step "Set Only ROI to the Image and Out of ROI to Zeros"). Finally, the computed ROI and the extracted non-zero image values can be saved (step "Save ROI Extracted Image").

Figure 4C:
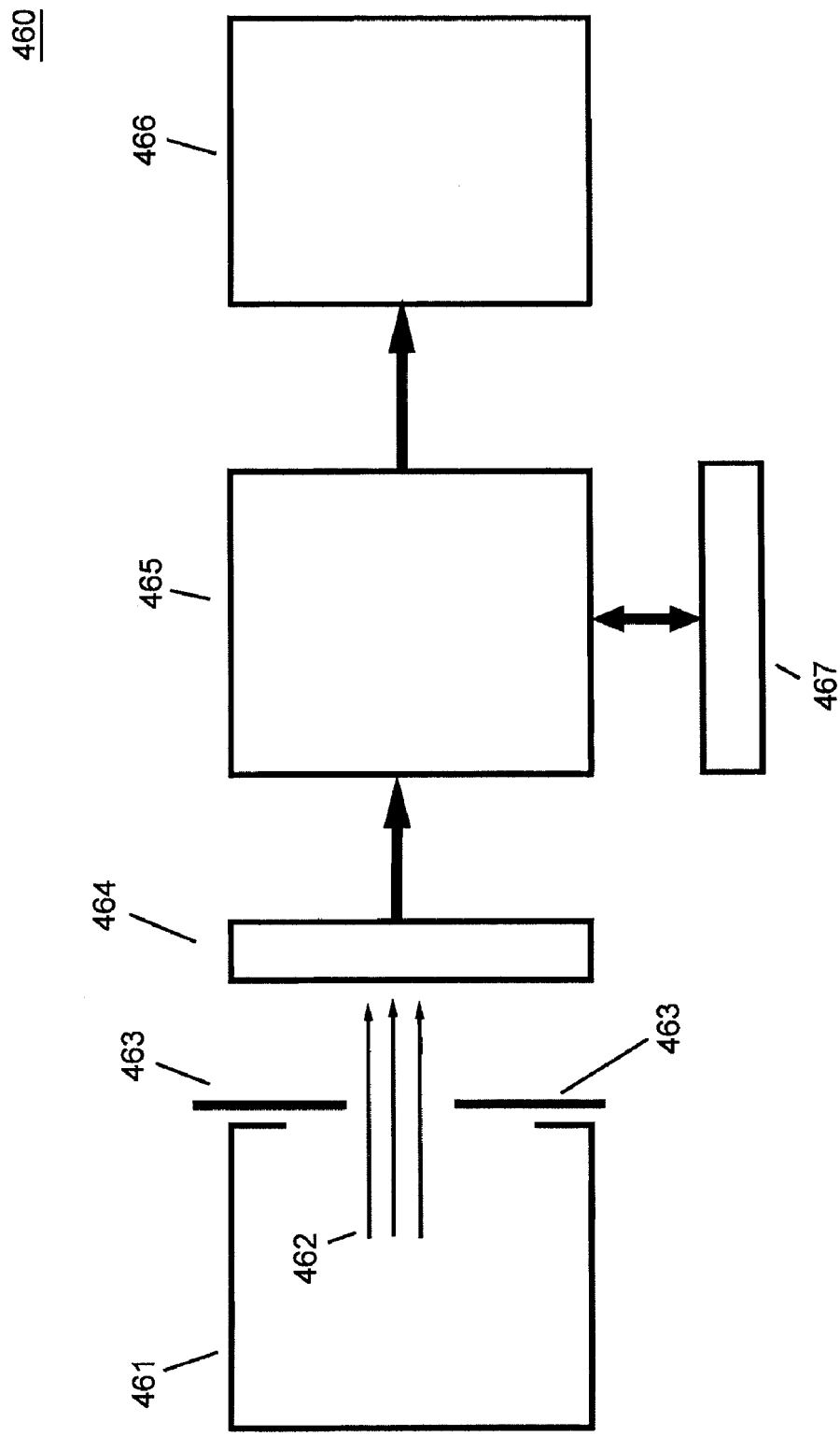
FIG. 4C shows a simplified block diagram of a medical imaging system suitable for use with the auto shutter ROI method.

FIG. 4C shows a block diagram of an exemplary medical imaging system suitable for use with the auto shutter ROI method. The medical imaging system 460 includes a source of imaging radiation 461, typically an X-ray source. Moveable blades 463 set the aperture for imaging radiation 462. Detector 464 detects received imaging radiation 462 (including absorbed, transmitted, and/or projected radiation) of the imaging radiation in a plane during an exposure, and corresponding image acquisition, typically creating a two dimensional (2D) image of the exposure. A medical imaging computer 465 can include one or more microcomputers communicatively coupled to detector 464. The medical imaging computer can also be configured to run an auto shutter ROI algorithm to find a region of interest (ROI) in each digital image. The auto shutter ROI algorithm and/or digital images and ROI data can be stored in memory such as is represented by memory 467.

Figure 5:
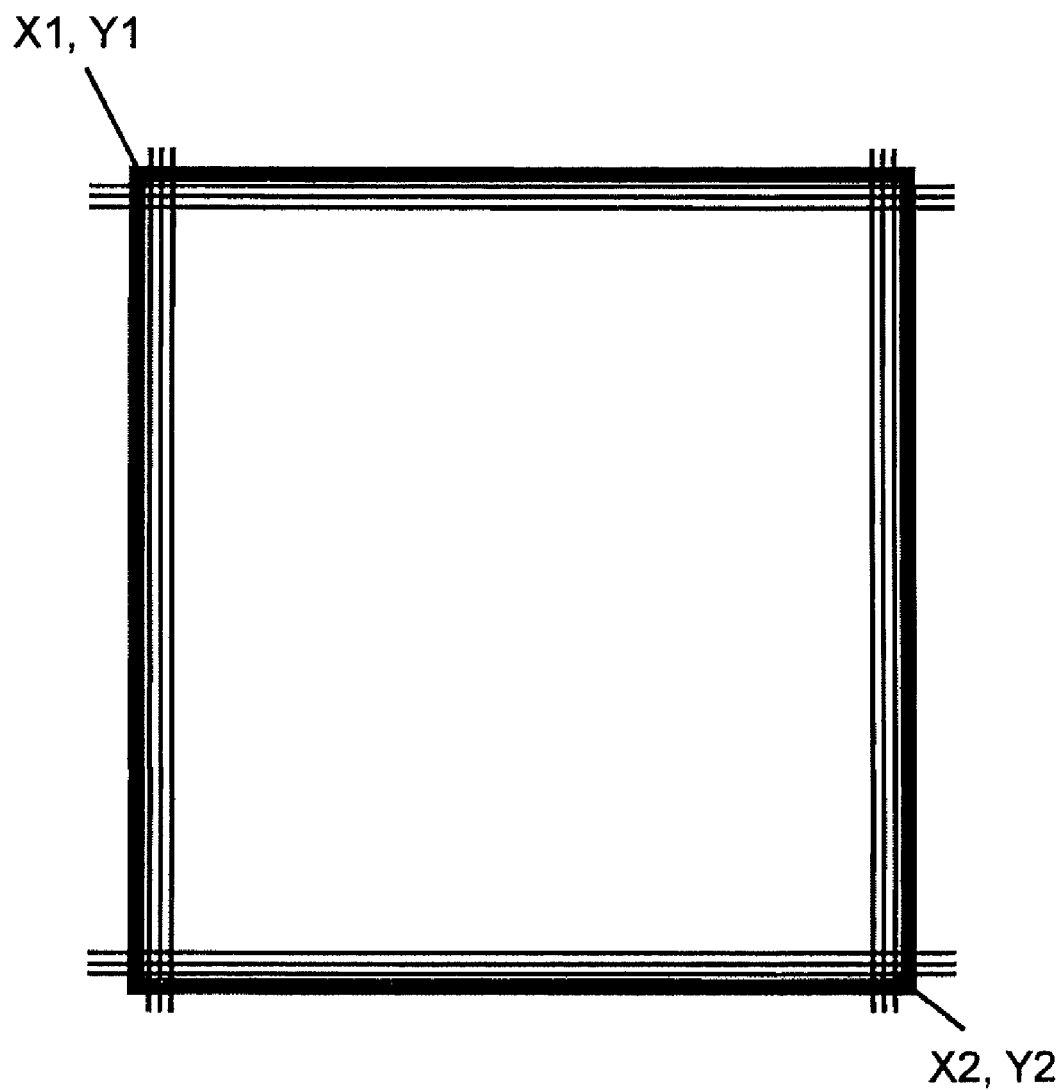
FIG. 5 shows an exemplary representation of a digital image having M×N pixels where the blades were in a completely open position open at the time of exposure.

The auto shutter ROI method is now discussed in more detail. FIG. 5 shows a representation of a digital image having M×N pixels where the blades are in completely open positions (maximum x-ray aperture). According to the auto shutter ROI algorithm, the image is first read. Y and X values are set to default zero values (i.e. X1=0, Y1=0, X2=0, and Y2=0). Next, the algorithm finds the maximum intensity value of the image, typically representing raw radiation (the brightest illumination in the image). A few lines (rows and columns) are identified on the top, right, bottom, and left sides of the image. Values are checked on these lines. If values representing raw radiation (or values close to raw radiation) are found on these outer lines, the method determines that the blades (shutters) were fully opened at the time of exposure. Values of X1, Y1, X2, Y2 are computed based on the values found on the top, right, bottom, and left sides of the image. If these values are successfully computed from the few outer rows and columns, the algorithm need not go further, since the blades were fully opened. In the digital image shown in FIG. 5, most of the pixel values in the few tested lines have gray scale values at or near the brightness of raw radiation, thus indicating a fully open aperture at the time of exposure. Since the ROI equals the extent of the image when the blades where were fully opened, any further image processing can be performed using the entire image.

Figure 6:
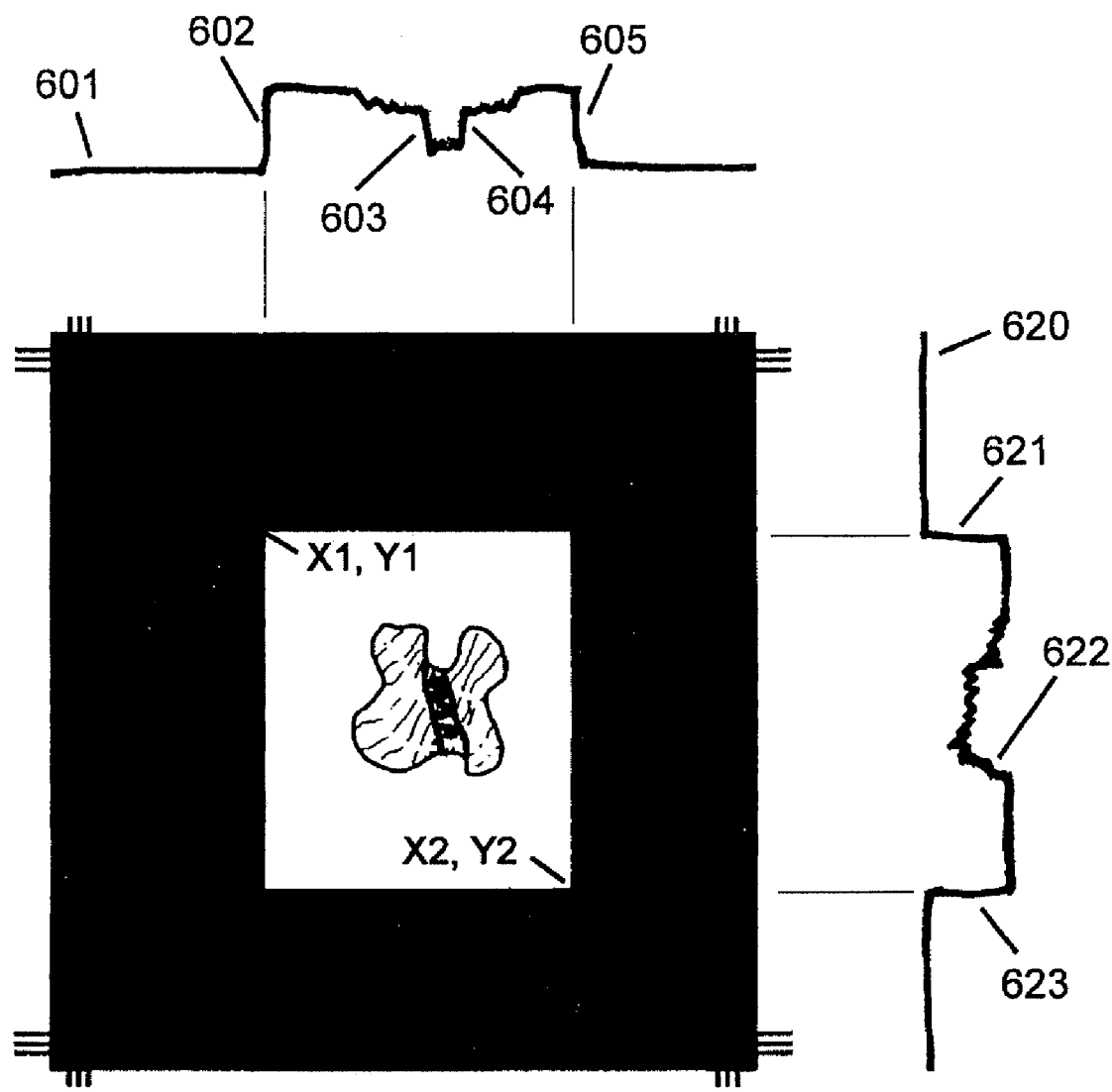
FIG. 6 shows graphs of exemplary horizontal and vertical mean projections of a digital image where the shutters were partially open at the time of exposure.

FIG. 6 shows a representation of a digital image having M×N pixels where the blades were in a partially closed position at the time of exposure. According to the auto ROI algorithm shown in FIG. 4B, the image is first read. Y and X values are set to default zero values (i.e. X1=0, Y1=0, X2=0, and Y2=0). Next, the algorithm finds the maximum intensity value of the image (typically representing raw radiation, the "brightest" illumination in the image). A few lines (rows and columns) are identified on the top, right, bottom, and left sides of the image. Values are checked on these lines. In the digital image of FIG. 6, there might be some pixel gray scale values indicative of x-ray scatter (the lowest brightness as shown in FIG. 2) otherwise the pixels along these test lines have a much lower intensity values than the maximum. Therefore X1, Y1, X2, and Y2 remain un-computed, and the method proceeds without stopping.

As the method proceeds, a mean value ("mean projection") is calculated for every row and column of the digital image. After this step is complete, there is a single mean projection value for every row and for every column. When viewed as a string of numbers, these strings or vectors of mean values show a progression of darker and lighter mean brightness values along the vertical (FIG. 6, 601) and horizontal (FIG. 6, 620) extents of the digital image, respectively from left to right and top to bottom. The method then finds relatively rapidly changes in the mean projection (mean brightness) values using edge detection methods as known in the art. Edges above certain threshold values are selected as acceptable or valid edges. Using such threshold criteria, generally less than 10 and more typically, less than 5 strong edges, are found in a digital image. Since there can typically be edges associated with physiological structure near the center of the digital image, one or more of the selected edges might be attributable to, for example, a bone to tissue or tissue to bone transition. The method excludes "valid" edges within some distance of the center of the image with an assumption that such edges are part of the desired image. Any "valid" edges in the pre-determined region about the center are ignored.

Continuing with the digital image of FIG. 6 in more detail, an exemplary graph of column mean projection values (one mean value for each column) is shown as column mean projection 601. Similarly, an exemplary graph of row mean projection values (one mean value for each row) is shown as row mean projection 620. Along column mean projection 601 there can be seen to be four valid edges 602, 603, 604, and 605 that exceed an exemplary pre-determined threshold based on edge detection. Edges 603 and 604, however, can be eliminated as within a pre-determined distance of the center of the image. Therefore edges 603 and 604 are assumed to be attributable to the physiological object of interest within the ROI. Having rejected edges 603 and 604, the algorithm can assign X1 to a column near edge 602 and X2 to a column near edge 605. The process is repeated for the rows along the row mean projection 620. Edge 622 can be rejected as within a predetermined distance of the center of the image, leaving edges 621 and 623 to generate ROI values Y1 and Y2.

As described above, the method has successfully determined X1, Y1, X2, and Y2 for an ROI of the exemplary digital image shown in FIG. 6. In other limited cases, where the auto shutter ROI algorithm is unable to find the ROI, the values X1, Y1, X2, and Y2 remain set to the default zero values. At the completion of the method, as shown in the block diagram of FIG. 4B, if the default values remain, there is an indication of a failure to find an ROI using the column and row mean projections. In the case of failure to find an ROI, the method uses the entire digital image (as if the blades were fully open at the time of exposure). If the ROI was successfully found and identified by the computed ROI as indicated by computed X1, Y1, X2, and Y2 values, all image (brightness) values outside of the ROI can be set to zero or a prespecified value. Finally the ROI X1, Y1, X2, and Y2 values and the extracted image can be saved to a desired memory media.

Figure 7:
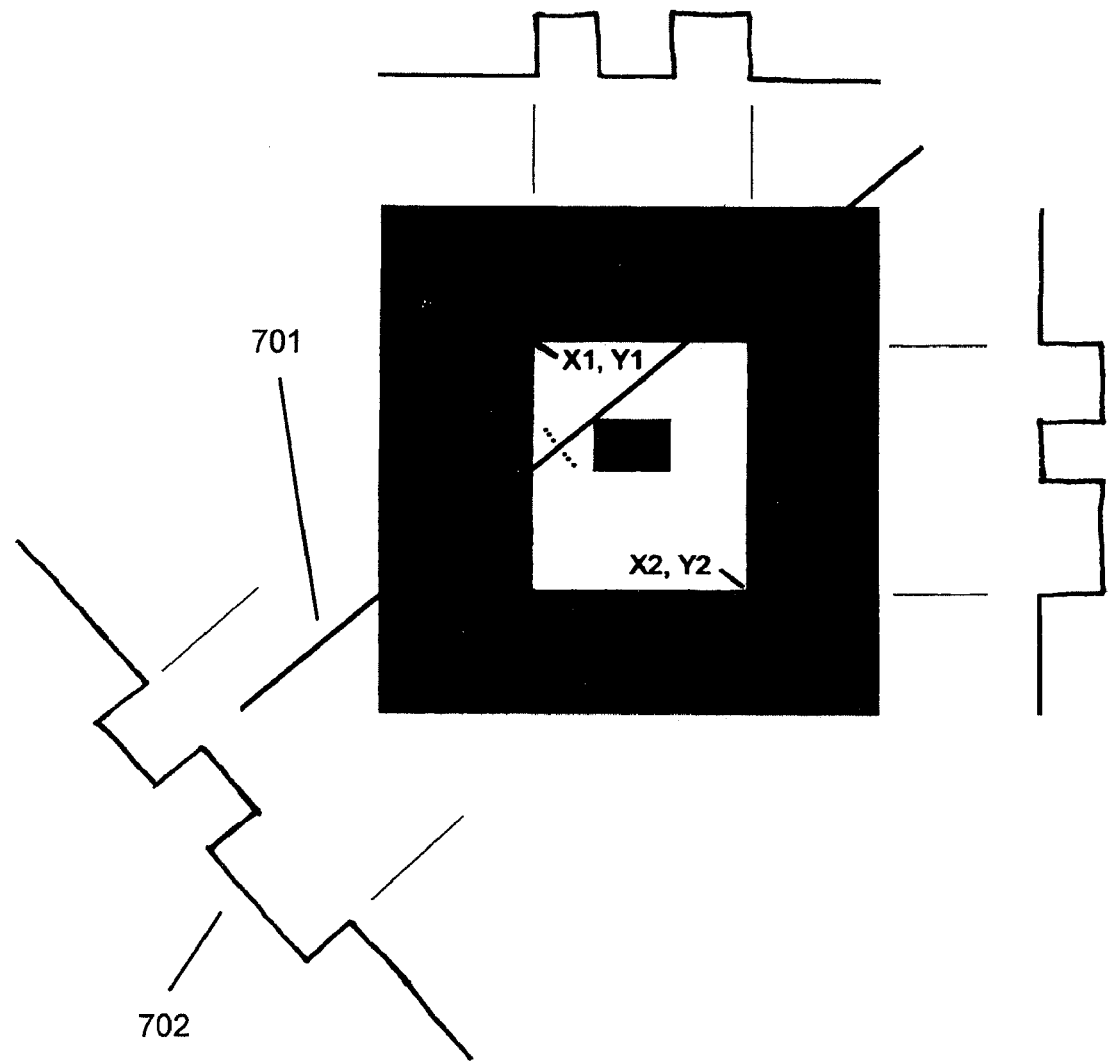
FIG. 7 shows an exemplary digital image adding n projection lines at approximately 45 degrees.

In another embodiment of the auto shutter ROI method, there can be lines at angles other than rows or columns through the plane of a digital image that can be used to create additional mean projections. These projections can be accomplished, for example, using any suitable Radon transform as known to those skilled in the art of image processing. FIG. 7 shows an exemplary digital image adding n projection lines 701 at an exemplary angle of about 45 degrees to the columns and rows. Exemplary projection 702 can be generated using the Radon transform. More than one off-axis transformation can be used at any angle with respect to the columns and rows of the digital image.

FIG. 8 shows a table of test results using the auto shutter ROI method as described above. As can be seen in the table, the ROI was correctly located with an overall accuracy of about 94%, typically taking less then 0.25 seconds for each ROI location. The failed images all had slanted ROI boundary edges, not easily determined by column and row projections. It is contemplated that additional Radon transformations, such as shown in FIG. 7 can correctly identify the ROI in digital images having slanted shutters resulting in off axis (slanted) ROIs.

While the present invention has been particularly shown and described with reference to the preferred mode as illustrated in the drawing, it will be understood by one skilled in the art that various changes in detail may be affected therein without departing from the spirit and scope of the invention as defined by the claims.

I claim:

1. A method to identify a Region Of Interest (ROI) within an image, said method comprising the steps of:
providing a digital image;
reading said digital image;
finding one or more predetermined brightness values in said digital image;
analyzing one or more lines near a plurality of outer edges of said digital image to test for values statistically close in brightness to said one or more found brightness values;
identifying an entire area of said digital image as said ROI if said found brightness values are also found in said one or more lines near said plurality of outer edges of said digital image;
computing two or more Radon transforms to generate two or more one dimensional (1D) projections of said digital image if said found brightness values are not found in said one or more lines near the outer edges of said digital image;
detecting a set of edges within said two or more 1D projections;
selecting edges from said set of edges;
validating said selected edges to identify a set of validated edges;
computing said ROI from said set of validated edges of said two or more 1D projections; and
saving said computed ROI to memory.

2. The method of claim 1, wherein the step of computing two or more Radon transforms comprises at least one Radon transform having a projection.

3. The method of claim 1, wherein the step of computing two or more Radon transforms comprises at least one Radon transform having a maximum projection.

4. The method of claim 1, wherein the step of computing two or more Radon transforms comprises computing a Radon transform projection of each column and each row of said digital image.

5. The method of claim 1, wherein the step of computing two or more Radon transforms comprises computing at least one Radon transform having a mean projection.

6. The method of claim 1, wherein the step of computing two or more Radon transforms further comprises computing a Radon transformation off-axis from each row and column of said digital image.

7. The method of claim 1, wherein the step of computing two or more Radon transforms comprises computing a Radon transformation having a projection at an angle.

8. The method of claim 1, wherein the step of computing two or more Radon transforms comprises computing a Radon transformation having horizontal and vertical mean projections.

9. The method of claim 8, wherein the step of computing two or more Radon transforms comprises computing one or more mean projections.

10. The method of claim 1, wherein the step of validating said selected edges to identify a set of validated edges further comprises excluding one or more of said selected edges.

11. The method of claim 1, wherein the step of computing said ROI from said set of validated edges further comprises excluding one or more of said detected edges within a predetermined region of said digital image.

12. The method of claim 1, further comprising a step setting starting ROI values to zeros, between said step of reading said digital image and said step of finding one or more predetermined brightness values.

13. The method of claim 12, wherein if said ROI values are not successfully computed from said validated edges of said two or more ID projections of said digital image, said ROI values are set to final values which include an entire area of said digital image and said digital image is saved to memory in its entirety.

14. The method of claim 1, wherein said step of saving said computed ROI to memory further comprises setting values of said digital image outside of said ROI, as computed in the step of computing said ROI from said set of edges, to zero or a prespecified value and saving said ROI.

15. An imaging system comprising:
a source of imaging radiation having a shutter configured by one or more adjustable blades;
a detector for detecting an absorbed, transmitted, or projection of said imaging radiation in a plane; and
an imaging computer component communicatively coupled to said detector and configured to run an auto shutter ROI algorithm to find a region of interest (ROI);
wherein said autoshutter ROI algorithm is configured to read a digital image electronically from said detector following a medical image acquisition, find one or more maximum brightness values within said digital image, analyze one or more lines near the outer edges of said digital image to look for values at or near said maximum brightness values, set said ROI to an entire area of said digital image if said maximum brightness values are found in said one or more lines near the outer edges of said digital image indicating that said shutter was substantially fully open during an exposure that created said digital image; and
wherein if said maximum brightness values are not found by using said one or more lines near the outer edges of said digital image indicating that said shutter was not in a substantially fully opened position during an exposure that created said digital image, said autoshutter ROI algorithm configured to calculate two or more Radon transforms to generate two or more 1D projections of said digital image to detect edges in said 1D projections, wherein one or more of said detected edges are selected, and said selected edges are validated to compute said ROI from said detected edges of said two or more ID projections of said digital image, and to save said ROI as computed to memory.

16. The imaging system of claim 15, wherein said source of imaging radiation comprises an X-ray source.

17. The imaging system of claim 15, wherein said two or more Radon transforms comprise projections of each column and each row of said digital image.

18. The imaging system of claim 15, wherein at least one Radon transform comprises a mean projection.

19. The imaging system of claim 15, wherein said autoshutter ROI algorithm is further configured to calculate at least one Radon transformation off-axis from each row and column of said digital image.

20. The imaging system of 19, wherein said at least one Radon transformation off-axis from said rows and columns comprises a mean projection.

21. The imaging system of claim 15, wherein said autoshutter ROI algorithm is further configured to reject one or more computed edges within a pre-determined region of said digital image.

22. The imaging system of claim 15, wherein said autoshutter ROI algorithm is further configured to set a set of starting ROI values to zeros after said digital image is read.

23. The imaging system of claim 22, wherein if said ROI values are not successfully computed from said detected edges of said two or more 1D projections of said digital image, said ROI values are set to final values which include an entire area of said digital image and said digital image is saved to memory in its entirety.

24. The imaging system of claim 15, further comprising setting values of said digital image outside of said ROI to zero or a prespecified value and saving the ROI as an extracted image.

* * * * *